(12) United States Patent
Leet (10) Patent No.: US 12,286,990 B2
(45) Date of Patent: *Apr. 29, 2025

(54) FASTENER SYSTEM FOR FURNITURE (71) Applicant: Patrick John Leet, Plainwell, MI (US)

(72) Inventor: Patrick John Leet, Plainwell, MI (US)

(73) Assignee: E. LEET WOODWORKING, LLC, Plainwell, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/392,721

(22) Filed: Dec. 21, 2023

(65) Prior Publication Data

US 2024/0117830 A1    Apr. 11, 2024

Related U.S. Application Data

(63) Continuation of application No. 17/463,741, filed on Sep. 1, 2021, now Pat. No. 11,849,837.

(60) Provisional application No. 63/073,251, filed on Sep. 1, 2020.

(51) Int. Cl.
*F16B 12/14* (2006.01)
*F16B 12/10* (2006.01)

(52) U.S. Cl.
CPC ...... *F16B 12/14* (2013.01); *A47B 2220/0055* (2013.01); *F16B 2012/106* (2013.01)

(58) Field of Classification Search
CPC .... A47B 2220/0055; A47B 2230/0022; A47B 13/003; A47B 2230/15; F16B 12/14; F16B 12/18; F16B 12/20; F16B 12/2063; F16B 2012/106; F16B 2012/103; F16B 12/24

See application file for complete search history.

(56) References Cited

U.S. PATENT DOCUMENTS

| 1,408,226 | A | * | 2/1922 | Sheldon | F16B 12/18 52/584.1 |
| 1,786,497 | A | * | 12/1930 | Krick | F16B 12/18 411/116 |
| 3,589,784 | A | | 6/1971 | Willhelm | |
| 3,722,431 | A | | 3/1973 | Howard | |
| 4,116,573 | A | | 9/1978 | Fuchs | |
| 4,261,665 | A | * | 4/1981 | Hsiung | F16B 12/14 403/219 |
| 4,299,067 | A | * | 11/1981 | Bertschi | E04B 2/7401 52/285.4 |
| 4,741,135 | A | * | 5/1988 | Baena | E04B 1/043 52/223.7 |
| 4,869,564 | A | | 9/1989 | Lechman | |
| 4,886,326 | A | | 12/1989 | Kuzyk | |

(Continued)

FOREIGN PATENT DOCUMENTS

EP     1004259 A1    5/2000
EP     2551534 B1    11/2013

(Continued)

*Primary Examiner* — Matthew R McMahon (74) *Attorney, Agent, or Firm* — Kintner IP, LLC; Mary Frances Ludwig (57) ABSTRACT

A fastener system for quick and easy assembly of an article of slatted furniture is used to join multiple slats and connects a support thereto. A flange inserted into one of the slats receives a stud connected to the support. A rod connects a plurality the slats, and mates with the flange. The flange and rod are rotatable within the slats to properly position and tighten the fastener system.

4 Claims, 11 Drawing Sheets

(56) References Cited

U.S. PATENT DOCUMENTS

| | | | |
|---|---|---|---|
| 5,209,598 A * | 5/1993 | Zullig | F16B 7/22 |
| | | | 403/231 |
| 5,501,541 A | 3/1996 | Gomes | |
| 5,802,780 A * | 9/1998 | Hammerschlag | F16B 7/18 |
| | | | 403/231 |
| 8,096,430 B2 | 1/2012 | Lim | |
| 9,456,697 B2 | 10/2016 | Simitian et al. | |
| 10,094,404 B2 | 10/2018 | Chesser et al. | |
| 10,273,999 B2 * | 4/2019 | Chang | F16B 12/14 |
| 10,595,632 B2 | 3/2020 | Elliott | |
| 10,767,676 B2 * | 9/2020 | Cattaneo | F16B 12/46 |
| 10,856,658 B2 | 12/2020 | Berloni et al. | |
| 11,406,189 B2 | 8/2022 | Schlanger | |
| 2005/0262789 A1 * | 12/2005 | Novoa | A47B 87/0246 |
| | | | 52/473 |
| 2008/0121144 A1 | 5/2008 | Chen | |
| 2019/0142175 A1 | 5/2019 | Cantrell | |
| 2021/0340757 A1 | 11/2021 | Marino | |

FOREIGN PATENT DOCUMENTS

| | | | |
|---|---|---|---|
| EP | 3815574 B1 | 1/2022 | |
| EP | 3153716 B1 | 10/2023 | |
| FR | 2333991 A1 | 7/1977 | |
| FR | 2372982 A1 * | 6/1978 | F16B 12/18 |
| FR | 2529819 A1 * | 1/1984 | F16B 12/24 |
| FR | 2596821 A1 | 10/1987 | |
| GB | 1133931 A | 11/1968 | |
| KR | 1034662 B1 * | 5/2011 | F16B 12/2063 |
| WO | 1997032507 | 9/1997 | |
| WO | 2011015254 A1 | 2/2011 | |

* cited by examiner

FASTENER SYSTEM FOR FURNITURE

CROSS REFERENCE TO RELATED APPLICATION

This application is a continuation of U.S. patent application Ser. No. 17/463,741, filed 1 Sep. 2021, which claims the benefit of U.S. Provisional Application No. 63/073,251, filed 1 Sep. 2020, both of which are hereby incorporated by reference in their entirety.

TECHNICAL FIELD

The present invention pertains generally to furniture construction, and more particularly to fastener systems for slatted furniture.

BRIEF SUMMARY OF THE EMBODIMENTS

The embodiments of a fastener system described herein provide a way to quickly and easily assemble an article of slatted furniture. The fastener system joins multiple slats and connects a support (such as a leg) thereto. The fastener system may also join a support to a solid, non-slatted furniture member. The system is suitable for various types of furniture, such as a bench, table, stool, bed frame, shelf, or the like. Elements of the fastener system are hidden from view in the finished assembly, providing an appealing overall aesthetic.

According to one or more embodiments, a fastener system is configured to cooperate with an article of slatted furniture, the furniture including a support and multiple slats each having a through hole. At least one of the slats may have a retainer hole. The fastener system includes:
- a stud configured for connection to the support;
- a flange configured for insertion into at least one slat, the flange having: a longitudinal channel having a proximal end dimensioned to receive the stud therethrough and an opposing distal end; a transverse channel oriented substantially orthogonally to the longitudinal channel and opening thereto; and an external aperture opening to the transverse channel;
- a rod configured to connect a plurality of the multiple slats, the rod having a rod end which is configured to mate with the distal end of the flange;
- a notch in the stud positioned to align with the external aperture of the flange when the stud is inserted therethrough; and
- wherein, the flange is rotatable within the at least one slat to position the external aperture of the flange for access through the retainer hole.

According to one or more embodiments, the rod is configured to be freely rotatable within the through holes of the connected plurality of slats.

According to one or more embodiments, the transverse channel passes through a diameter of the flange and two opposing external apertures open to the transverse channel.

According to one or more embodiments, a retainer is configured for insertion through the external aperture of the flange into the transverse channel and engagement with the notch in the stud.

According to one or more embodiments, the notch is circumscribed around the stud.

According to one or more embodiments, the notch has sidewalls which taper inwardly from an exterior surface of the stud to a floor of the notch.

According to one or more embodiments, the flange has a flange head configured to mate with a driver for rotating the flange within the at least one slat.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the fastener system for furniture are described with reference to the following figures, wherein like reference numerals refer to like parts throughout the various views unless otherwise specified.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

| LIST OF DRAWING REFERENCE NUMERALS | |
|---|---|
| 20 | fastener system |
| 30 | stud |
| 32 | end |
| 33 | exterior surface |
| 34 | stud head |
| 35 | recess |
| 36 | notch |
| 38a, 38b | sidewalls |
| 39 | floor |
| 40 | flange |
| 42 | longitudinal channel |
| 44 | transverse channel |
| 45 | slot |
| 46 | external aperture |
| 48 | distal end |
| 49 | flange head |
| 50 | proximal end |
| 60 | rod |
| 62 | rod end |
| 70 | spacer |
| 72 | central aperture |
| 80 | retainer |
| 90 | flange tool |
| 92 | blade |
| 94 | shank |
| 96 | tongue |
| 500 | slatted furniture |
| 510 | support |
| 512 | threaded region |
| 520 | exterior slat |
| 522 | through hole |
| 530 | second slat |
| 532 | through hole |
| 534 | retainer hole |
| 540 | slat |
| 542 | through hole |
| 580 | solid member |

DETAILED DESCRIPTION OF THE INVENTION

Referring initially to FIGS. 1-6, there are illustrated upper and lower perspective, end, top, side, and bottom views, respectively, of an article of slatted furniture generally designated 500. Slatted furniture 500 includes an embodiment of a fastener system designated 20. In general, fastener system 20 connects multiple slats to form a slatted surface, also referred to herein as a deck. Fastener system 20 connects a furniture support 510 to the deck. Support 510 may be, for example, a leg, a stand, a mounting bracket, or similar.

View orientations used herein are with respect to an article of furniture, where a side refers to a major dimension, an end refers to a minor dimension, the top is oriented away from a floor, and the bottom is oriented toward the floor.

As used herein, the term "shaped" means that an item has the overall appearance of a given shape even if there are minor variations from the pure form of said given shape.

As used herein, the terms "generally" or "substantially" when referring to a shape mean that an ordinary observer will perceive that an object has said shape even if there are minor variations from said shape.

As used herein, the conjunction "or" is to be construed inclusively (e.g., "A or B" would be interpreted as "A, or B, or both A and B"; e.g., "A, B, or C" would be interpreted as "A; or B; or C; or any two of A, B, and C; or all three of A, B, and C").

As used herein, the term "about" or "approximately" or "substantially when referring to a number refers to a range of values within plus or minus 10% of the specified number.

Figure 1:
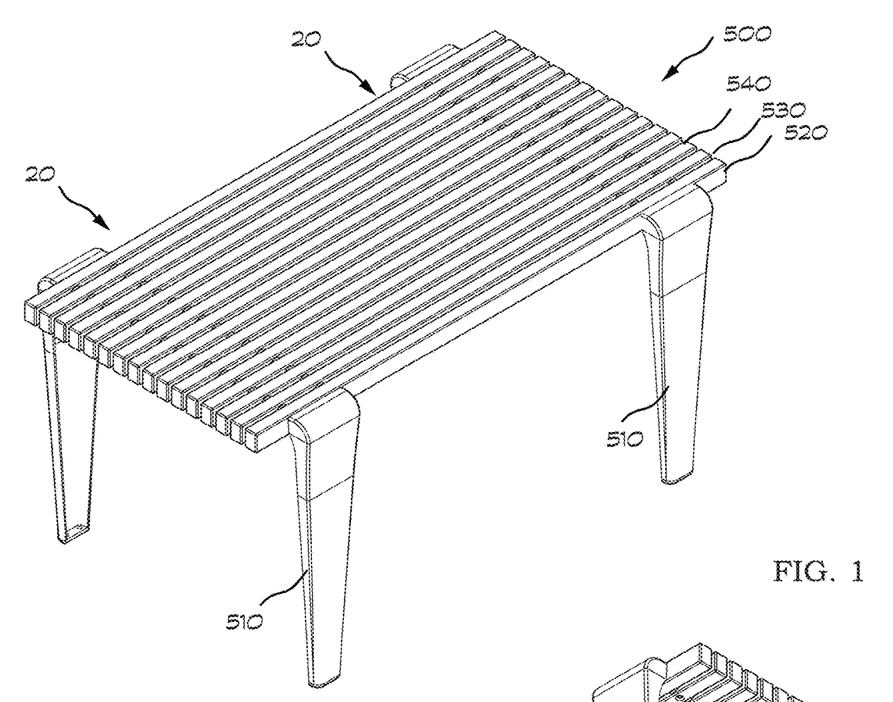
FIG. 1 is an upper perspective view of an article of slatted furniture including an embodiment of a fastener system.
Figure 2:
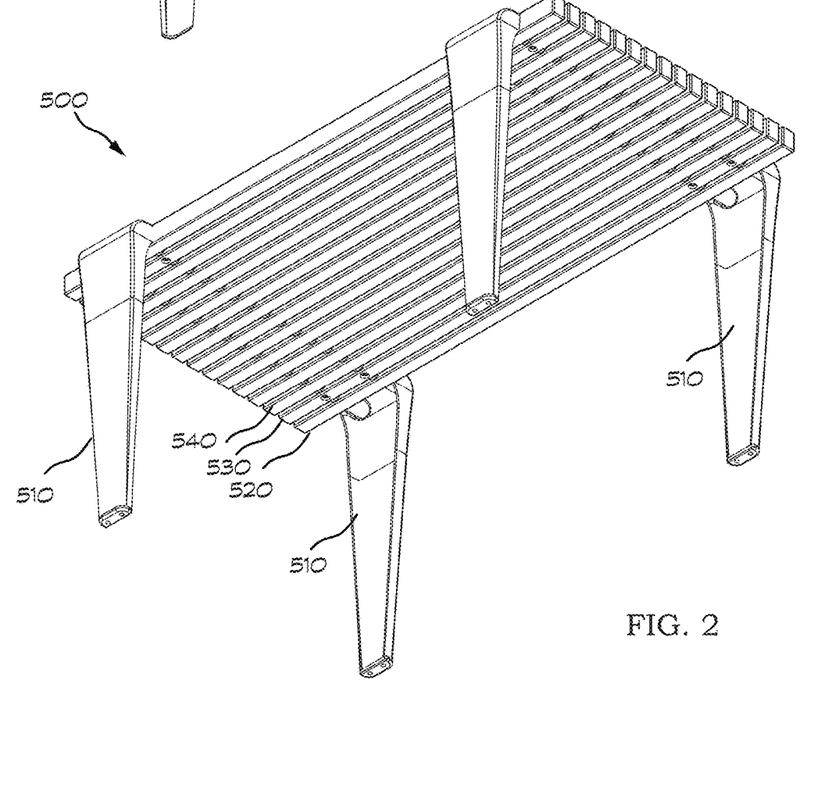
FIG. 2 is a lower perspective view thereof.
Figure 3:
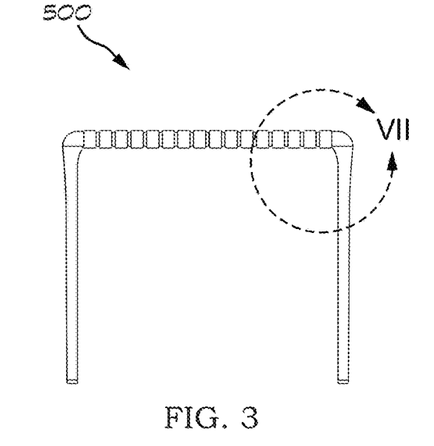
FIG. 3 is an end view thereof.
Figure 4:
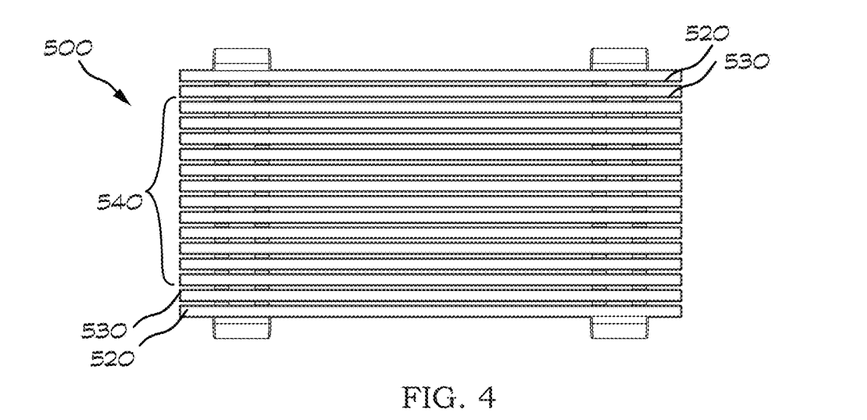
FIG. 4 is a top view thereof.
Figure 5:
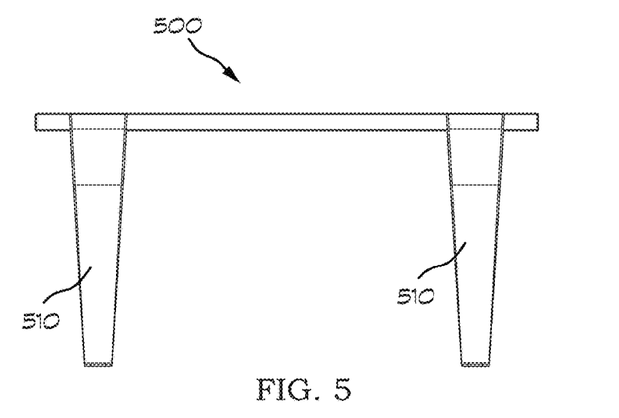
FIG. 5 is a side view thereof.
Figure 6:
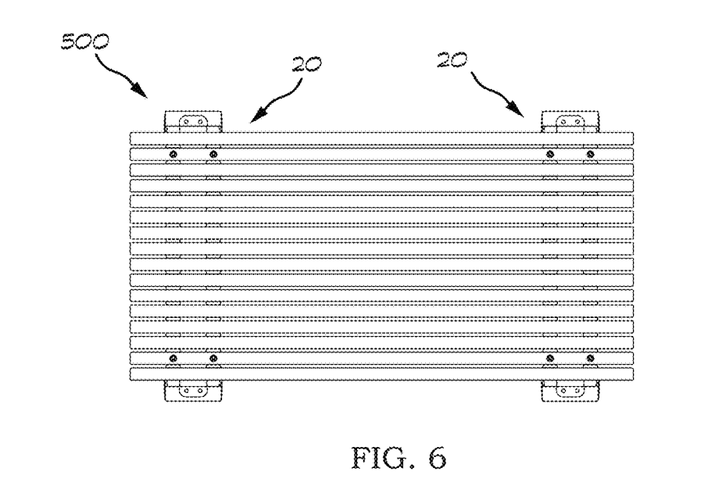
FIG. 6 is a bottom view thereof.
Figure 7:
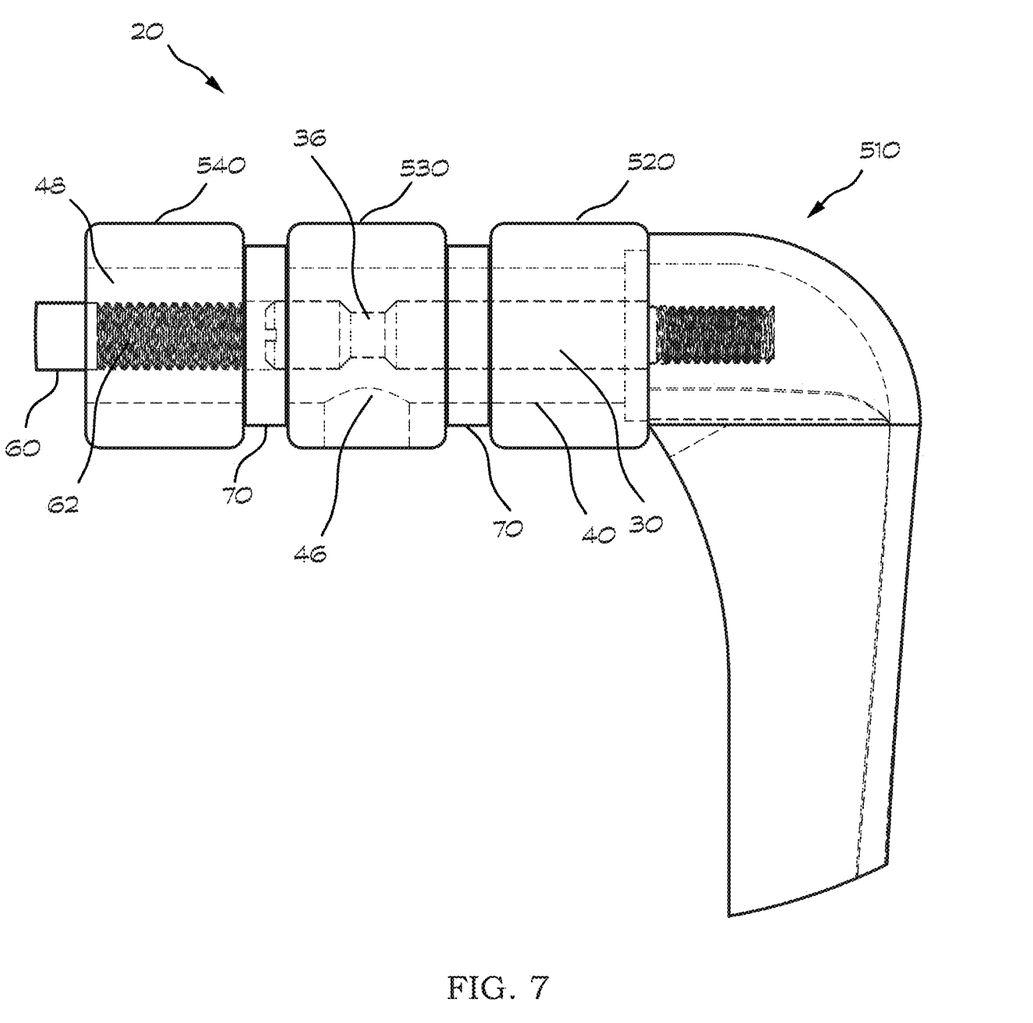
FIG. 7 is an enlarged view of region VII of FIG. 3.
Figure 8A:
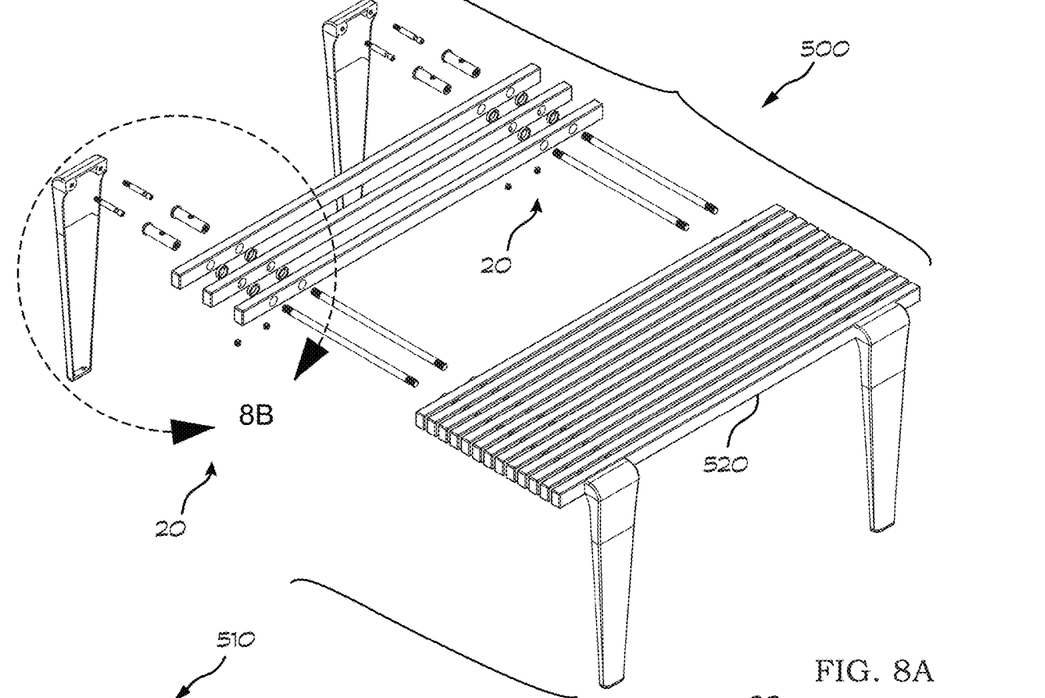
FIG. 8A is a reduced partially exploded view of an embodiment of an article of slatted furniture.
Figure 8B:
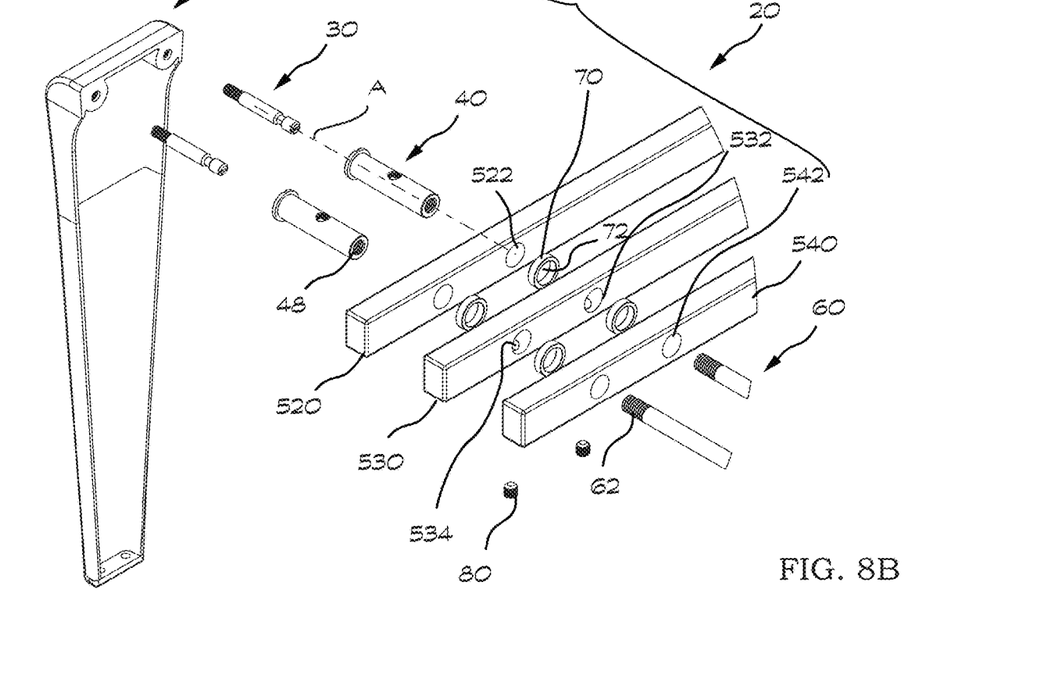
FIG. 8B is an enlarged view of region 8B of FIG. 8A.
Figures 9, 10, 11, 12:
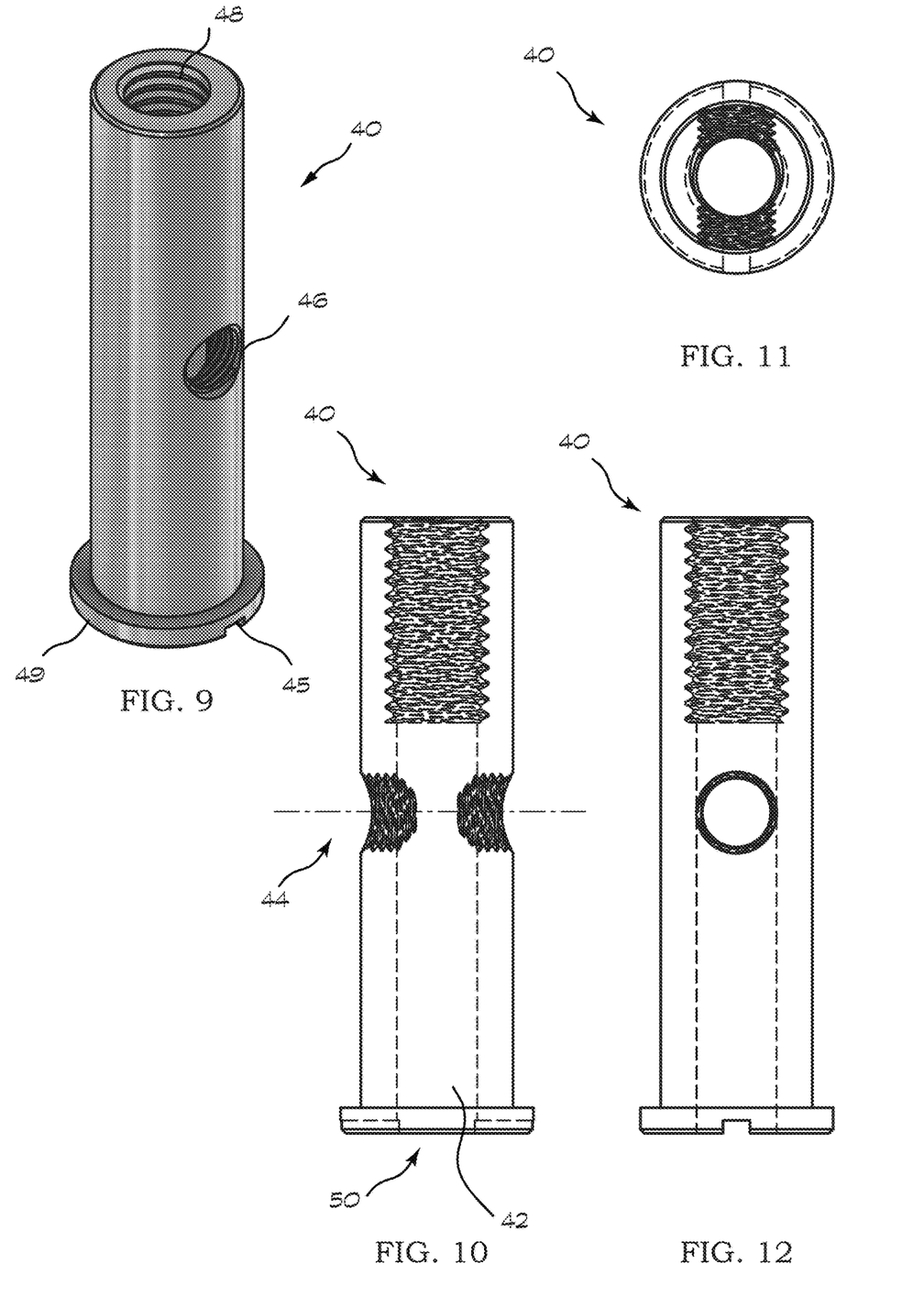
FIG. 9 is an enlarged perspective view of an embodiment of a flange of the fastener system.
FIG. 10 is an end view of the FIG. 9 embodiment.
FIG. 11 is a side view of the FIG. 9 embodiment.
FIG. 12 is a bottom view of the FIG. 9 embodiment.
Figure 13:
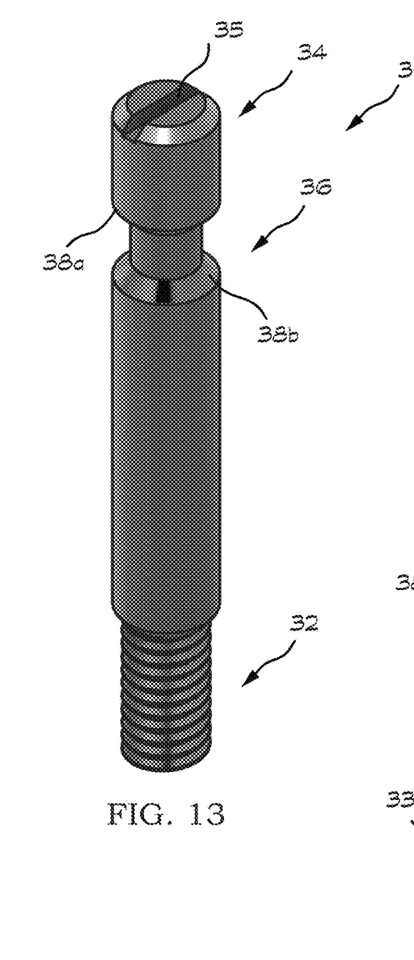
FIG. 13 is an enlarged perspective view of an embodiment of a stud of the fastener system.
Figure 14:
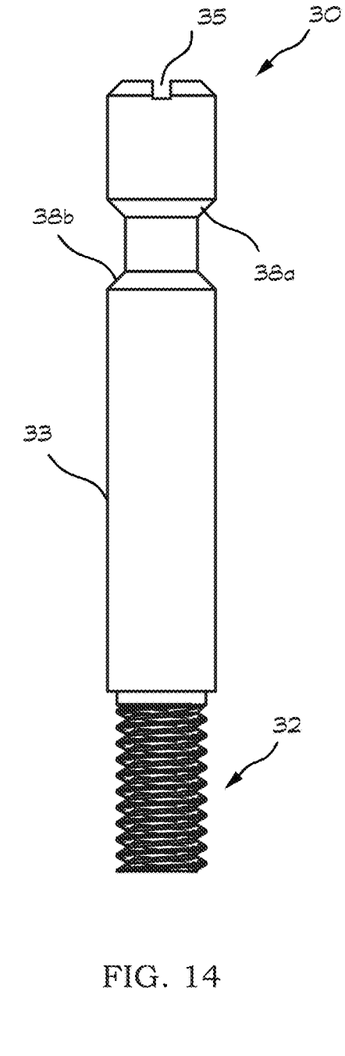
FIG. 14 is an end view of the FIG. 13 embodiment.
Figure 15:
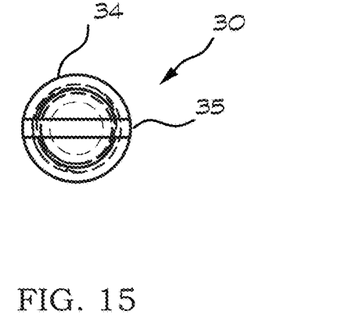
FIG. 15 is a side view of the FIG. 13 embodiment.
Figure 16:
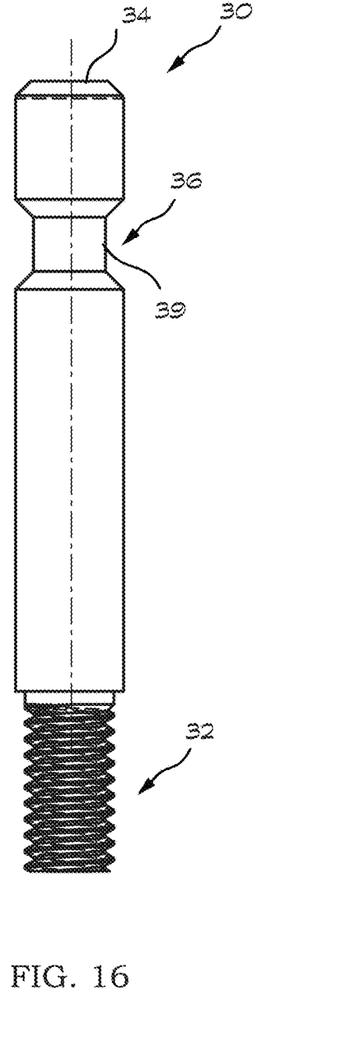
FIG. 16 is a bottom view of the FIG. 13 embodiment.
Figure 18:
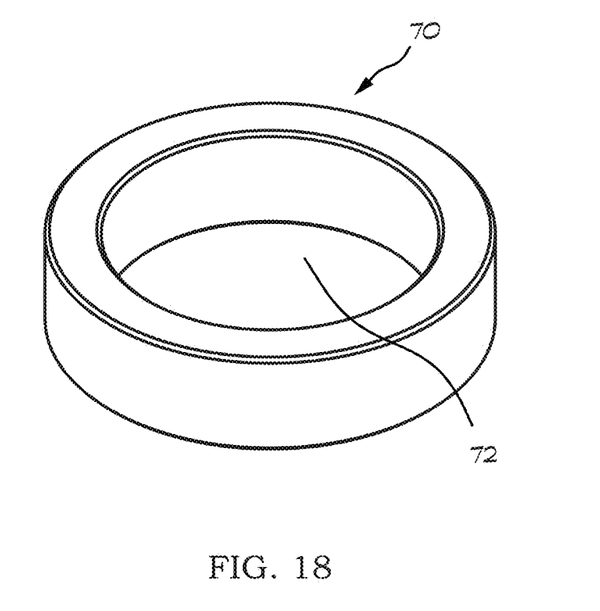
FIG. 18 is an enlarged perspective view of an embodiment of a spacer of the fastener system.

Components of an embodiment of fastener system 20 are shown in the end view of FIG. 7, where hidden elements are shown in dashed lines, and in the exploded views of FIGS. 8A and 8B. In the shown embodiment, furniture 500 is a slatted bench having four supports 510, which are legs. Multiple slats (e.g., 520, 530, 540) are connected in spaced apart relation along rods 60. In the shown embodiment, four rods are present, offset from one another along the major dimension of the deck. Spacers 70 (see also FIG. 18-19) may be interposed between the slats. The deck is assembled by inserting each rod 60 alternately through a through hole (522, 532, 542) in a slat and through a central aperture 72 of a spacer, forming a deck sub-assembly.

Figure 17:
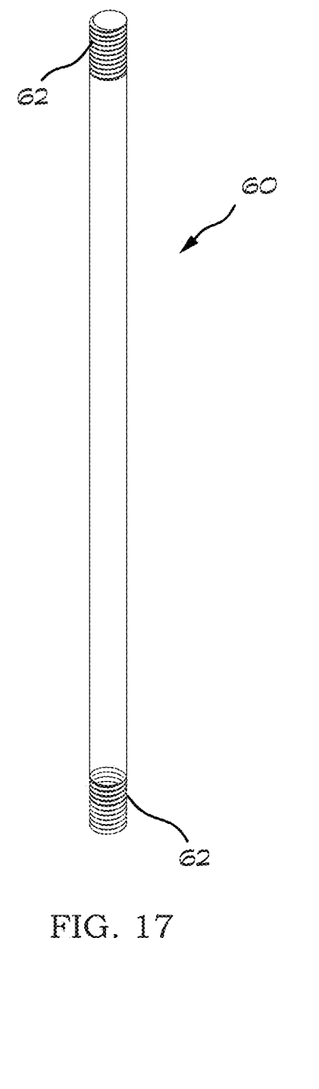
FIG. 17 is an enlarged perspective view of an embodiment of a rod of the fastener system.

FIGS. 9-12 are enlarged perspective, end, side, and bottom views, respectively, of a flange 40 of the fastener system. Flange 40 is shaped and dimensioned to be inserted into a through hole 522 of an exterior slat 520, and may extend through one or more additional slats (e.g. into a through hole 532 of a second slat 530). A distal end 48 of flange 40 is configured to mate with a rod end 62 of rod 60 (see also FIG. 17).

Figure 25:
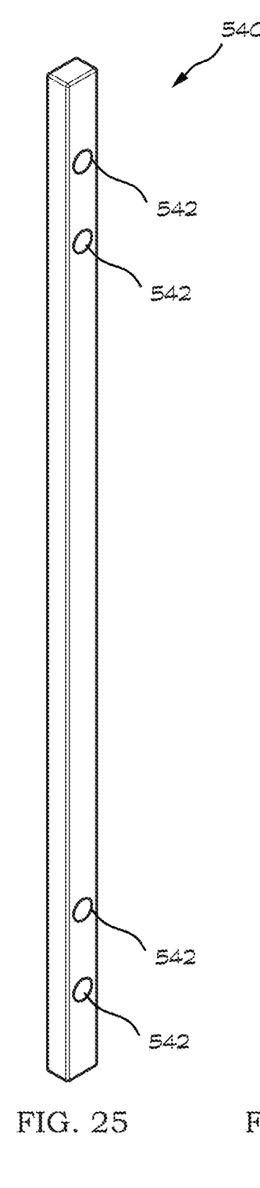
FIG. 25 is an enlarged perspective view of an embodiment of a middle slat of an article of slatted furniture.
Figure 26:
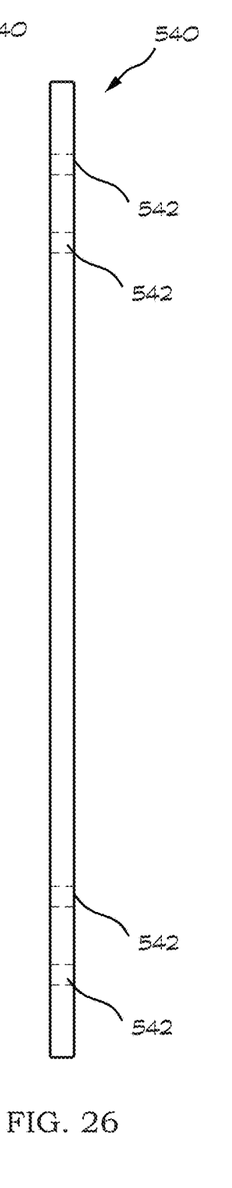
FIG. 26 is a top view of the FIG. 25 embodiment.

During assembly (refer to FIGS. 7, 8A, & 8B), rod 60 is inserted into through holes 542 of multiple slats 540. Twelve of slat 540 are present in the shown embodiment (see also FIGS. 25-26), although more or fewer slats may be used depending on the desired size of furniture. Flange 40 is inserted into exterior slat 520, through second slat 530, and distal end 48 of flange 40 mates with rod end 62 (shown internal to slat 540 in FIG. 7). In the shown example, distal end 48 has an internal thread sized to mate with an external thread of rod end 62, although other mating configurations may be used.

Figure 20:
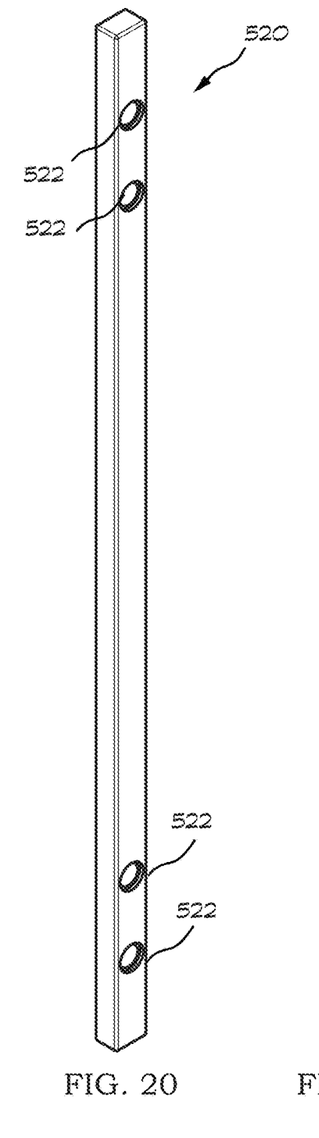
FIG. 20 is an enlarged perspective view of an embodiment of a first slat of an article of slatted furniture.
Figures 21, 22, 23, 24:
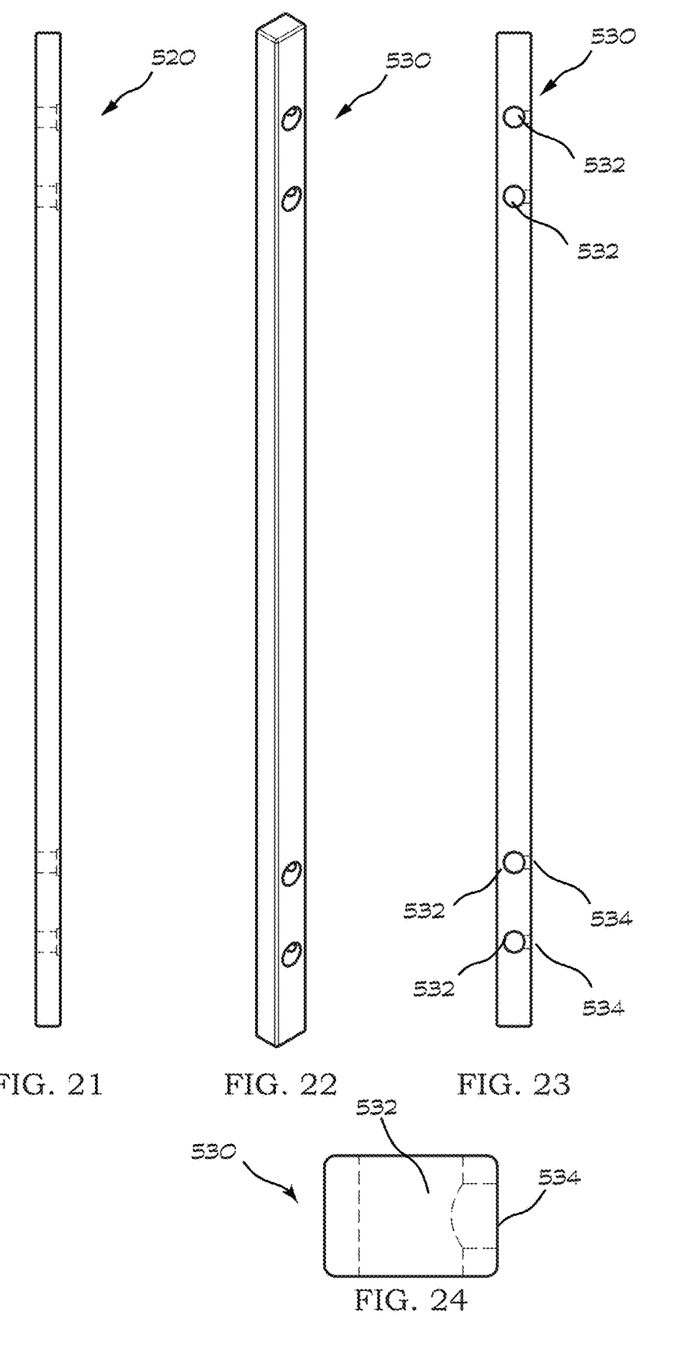
FIG. 21 is a top view of the FIG. 20 embodiment.
FIG. 22 is an enlarged perspective view of an embodiment of a second slat of an article of slatted furniture.
FIG. 23 is a side view of the FIG. 22 embodiment.
FIG. 24 is an end view of the FIG. 22 embodiment.

Flange 40 has a flange head 49. The flange head 49 may include a slot 45 suitable for insertion of a screwdriver or a custom driver, such as flange tool 90 discussed below. The shown flange head 49 has a flat exterior face configured to fit within a counter-bore of through hole 522, visible in FIGS. 20-21. The counter-bore provides a smooth exterior surface when flange 40 is assembled in exterior slat 520, and allows the surfaces of leg 510 and exterior slat 520 to closely contact one another (see FIG. 7).

Flange 40 has a longitudinal channel 42 dimensioned to receive the stud through a proximal end 50. Flange 40 also has a transverse channel 44 which opens to longitudinal channel 42. Transverse channel 44 has an external aperture 46 configured to align with a hole in bottom of one of the slats, such as retainer hole 534 of second slat 530 (shown in FIGS. 22-24). Flange 40 may be rotated within the slats to align external aperture 46 with retainer hole 534. In the shown embodiment the transverse channel goes through the entire diameter of the flange, and may therefore be aligned with retainer hole 534 in either of two positions (rotated about 180 degrees apart from one another).

Figures 27, 28:
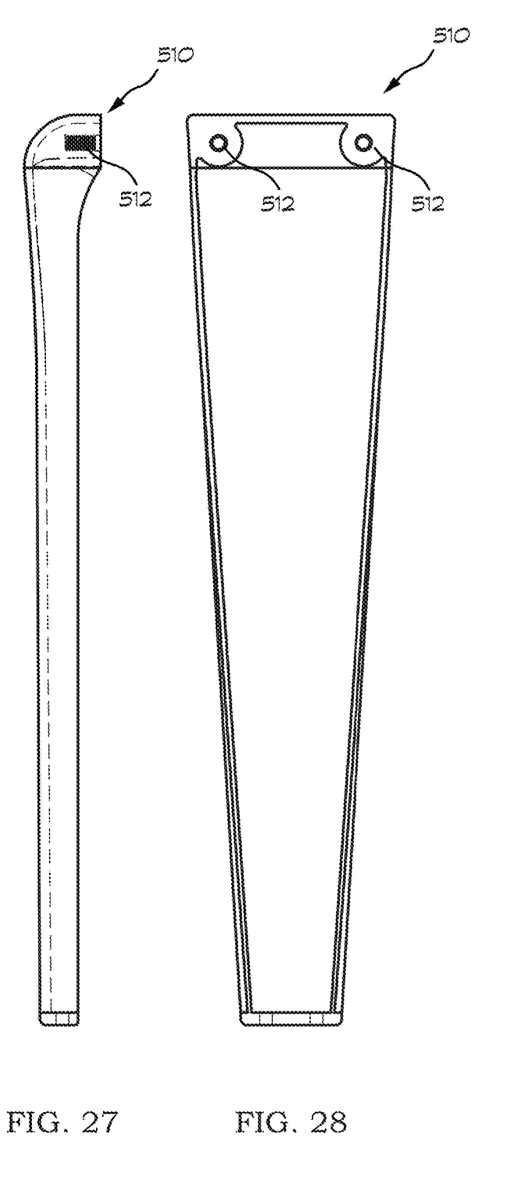
FIG. 27 is an enlarged end view of an embodiment of a support of an article of slatted furniture.
FIG. 28 is a side view of the FIG. 27 embodiment.
Figure 29:
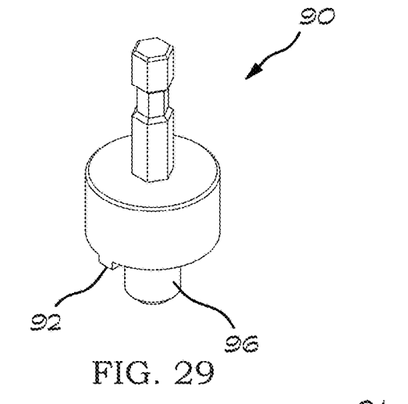
FIG. 29 is an enlarged perspective view of an embodiment of a flange tool.
Figure 30:
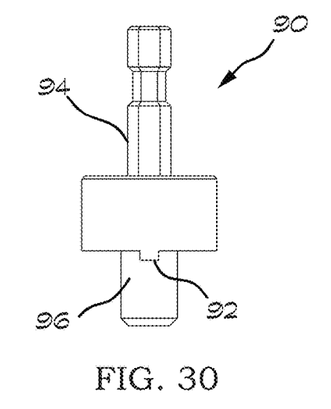
FIG. 30 is a top view of the FIG. 29 embodiment.
Figure 31:
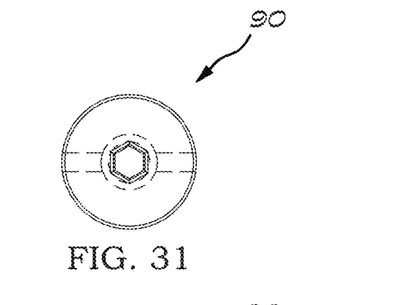
FIG. 31 is a first side view of the FIG. 29 embodiment.
Figure 32:
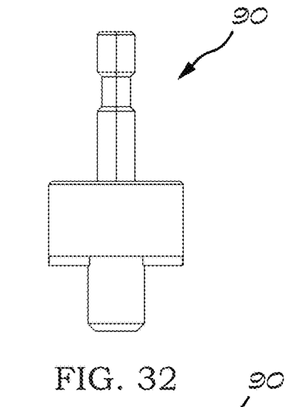
FIG. 32 is an end view of the FIG. 29 embodiment.
Figure 33:
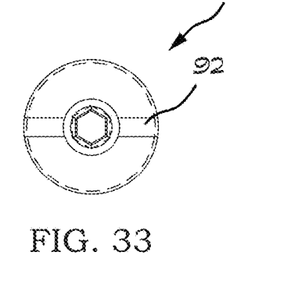
FIG. 33 is a second side view of the FIG. 29 embodiment.

FIGS. 13-16 are enlarged perspective, end, side, and bottom views, respectively, of an embodiment of a stud 30. Stud 30 is connectable to leg 510, for example in threaded region 512, shown in FIGS. 27-28. An end 32 of the shown stud has an external thread configured to mate with a threaded region 512 of leg 510. Alternative ways of mating the stud with the leg could be used, such as providing a shaft at end 32 to be mated with a hole in leg 510, with or without adhesive. A stud head 34 has a recess 35 suitable for inserting a driver. In the shown embodiment, recess 35 is suitable for a flathead screwdriver, although a recess for a hex wrench, Phillips head, or other type of driver may alternatively be provided.

In the shown embodiment, two studs 30 are assembled to each of four legs 510 by screwing threaded ends 32 into corresponding threaded regions 512. A screwdriver may be inserted into recess 35 and used to drive the stud into the leg. The assembly of a leg with mated studs is referred to herein as a support sub-assembly.

Stud 30 further includes a notch 36, shown revolved around the body of stud 30 (i.e., notch 30 may be rotationally symmetric about a longitudinal axis, A, of the stud). Notch 36 is configured to align with external aperture 46 of the flange when the stud is inserted into the flange (see FIG. 7). The notch has angled sidewalls 38a, 38b which taper inwardly from an exterior surface 33 of the stud toward the central longitudinal axis of the stud, forming a wider opening at the outer region of the notch and a more narrow floor 39 of the notch. As shown, sidewalls 38a, 38b taper inwardly at a 45° angle, although different angles may be used to achieve the same result.

The support sub-assemblies are joined to the deck sub-assembly by inserting each stud 30 into the longitudinal channel 42 of one flange 40 to a depth where notch 36 of the stud aligns with external aperture 46 of the flange. A retainer 80, such as a set screw, is inserted through retainer hole 534 and external aperture 46 to contact floor 39 or sidewalls 38a, 38b of the notch. In the shown embodiment, transverse channel 44 is threaded for mating with a threaded retainer 80. Angled sidewalls 38a, 38b guide retainer 80 toward the narrow floor 39 of notch 36, while drawing the support sub-assembly inward to contact the deck sub-assembly.

Figure 34:
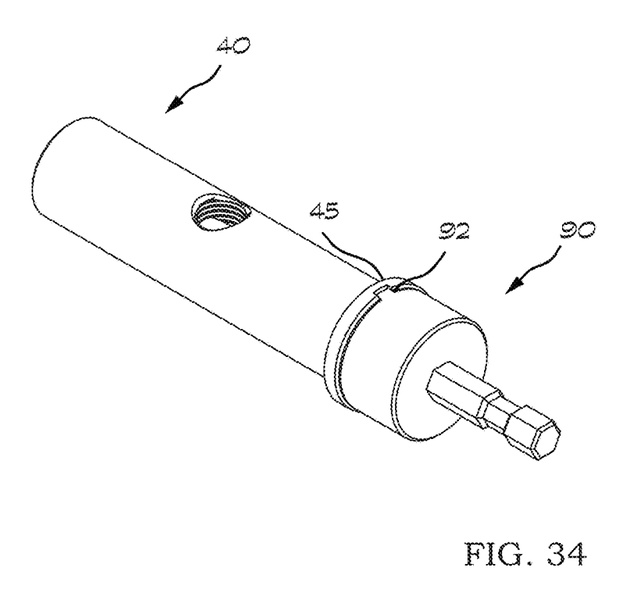
FIG. 34 is a perspective view of the flange tool in engagement with the flange.

FIGS. 29-33 are views of a flange tool 90 which may be provided with fastener system 20. Flange tool 90 may be used to rotate flange 40 within the deck sub-assembly, for the purpose of aligning external aperture 46 with retainer hole 534. In the shown embodiment, flange tool 90 has a blade 92 sized to engage slot 45 of the flange head. The tool also includes a tongue 96 which is sized to engage the flange through the longitudinal channel 44 (see FIGS. 9-12). A shank 94 is provided on the opposite side from blade 92, and may be used to grip or drive the flange tool, such as with pliers, a drill, or a bit driver. FIG. 34 illustrates how flange tool 90 may engage flange 40.

Figure 35:
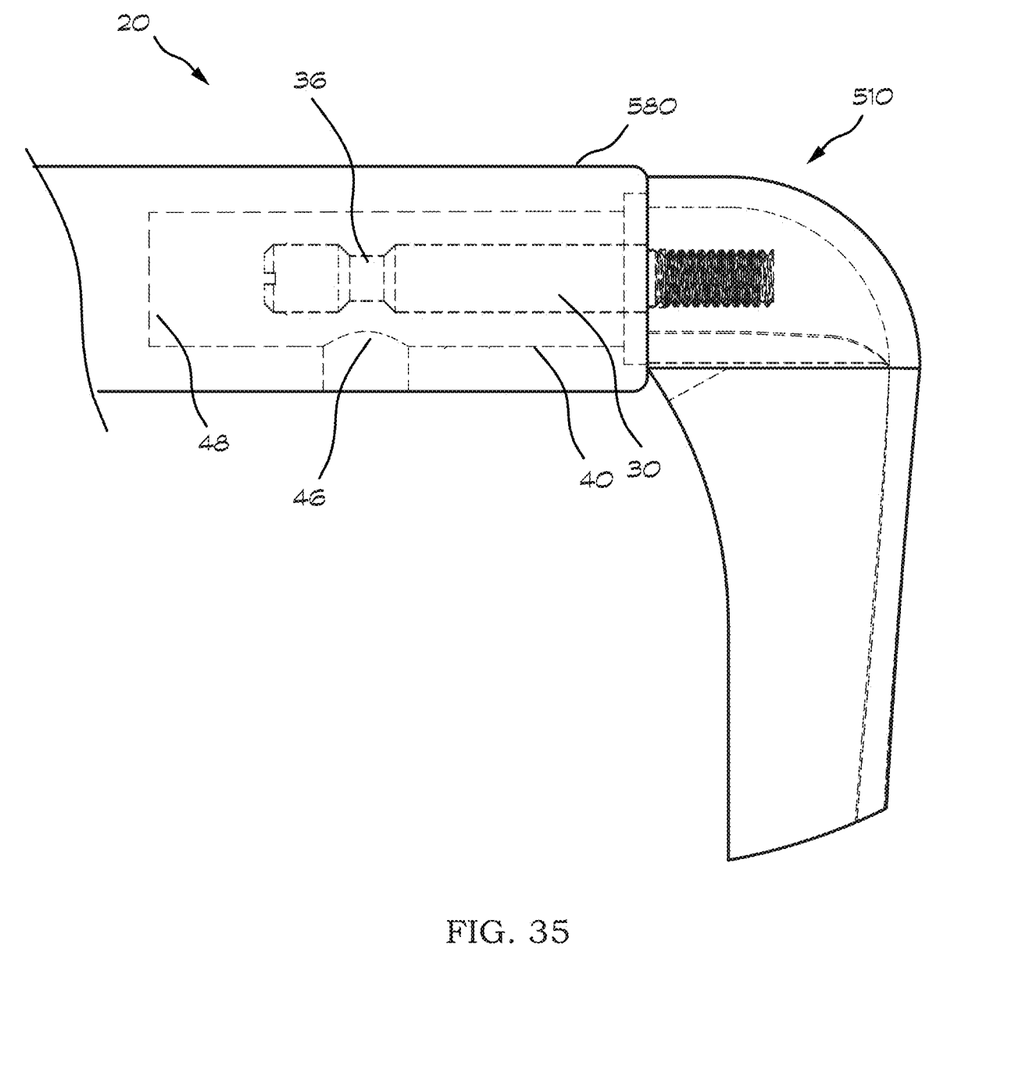
FIG. 35 is an enlarged partial end view of another embodiment of the fastener system.

FIG. 35 shows components of another embodiment of fastener system 20, for joining a support (e.g. leg 510) to a solid member 580 of the article of furniture. Solid member 580 may be, for example, a bench top, a chair seat, or a shelf. Stud 30 is connected to support 510 in the manner described above. Flange 40 is inserted into a complementary shaped hole in solid member 580, and may have features and a shape as described above. External aperture 46 of the flange is aligned with a hole in solid member 580. To join the solid member to the support, stud 30 is inserted into flange 40 and a retainer is inserted into external aperture 46 to contact notch 36 of the stud. In this manner the support is drawn inwardly to contact solid member 580. While the FIG. 35 embodiment shows support 510 being a leg, the support may take alternate forms, such as a shelf bracket which may be mounted to a wall before or after connection to solid member 580.

Figure 19:
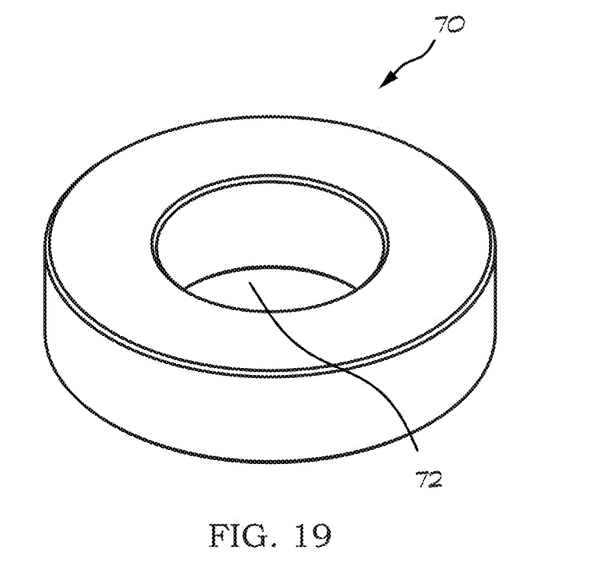
FIG. 19 is an enlarged perspective view of another embodiment of a spacer of the fastener system.

The following dimensions for elements of fastener system 20 provide an exemplary embodiment suitable for a slatted bench. Flange 40 may have a length of about 3 inches and a diameter of about 0.75 inches. Stud 30 may have a length of about 2.75 inches and a diameter of about 0.375 inches. Each slat (520, 530, 540) may have a length of about 36 inches, a width of about 0.875 inches, and a height of about 1.25 inches. Spacers 70 may have an outer diameter of about 1 inch and an inner diameter (of central aperture 72) of about 0.75 inches (FIG. 18) or of about 0.5 inches (FIG. 19).

The flange, stud, and rod may be made of stainless steel or other materials suitable for fastening hardware. The slats may be made of wood, composite plastic, or other material suitable for furniture. The spacers may be formed of anodized aluminum, plastic, rubber, or other materials. The legs may be cast aluminum, wood, composite plastic, or other material suitable for furniture supports.

The supports of the shown embodiment (legs 510) are exemplary, and the system may function in a similar manner with other types of support. Support legs may be of different shape or dimensional ratio from the illustrated leg 510. More or fewer than four legs may be used to support different styles of furniture. In another embodiment, the support may be a mounting bracket for a shelf. One side of the mounting bracket may connect with studs 30 of the fastener system, while the opposite side is configured to contact a wall or other surface. In such an embodiment, supports may be present on only one side of the slatted furniture.

Further provided is an article of furniture, wherein fastener system 20 is packaged with the slats, supports, and other components of an article of furniture. In other embodiments, the components of the fastener system may be packaged independently of the other furniture pieces. Embodiments may optionally include a flange tool.

In terms of use, a method of assembling an article of slatted furniture includes: (refer to FIGS. 1-35)
   a. providing a plurality of slats (520, 530, 540), each having a through hole (522, 532, 542), one of the plurality of slats having a retainer hole 534;
   b. providing a support 510;
   c. providing a fastener system 20 including:
      i. a stud 30 configured for connection to the support;
      ii. a flange 40 configured for insertion into at least one of the plurality of slats, the flange having: a longitudinal channel 42 having a proximal end 50 dimensioned to receive the stud therethrough and an opposing distal end 48; a transverse channel 44 oriented substantially orthogonally to the longitudinal channel and opening thereto; and an external aperture 46 opening to the transverse channel;
      iii. a rod 60 configured to connect two or more of the plurality of slats, the rod having a rod end 62 which is configured to mate with the distal end of the flange; and
      iv. a notch 36 in the stud positioned to align with the external aperture of the flange when the stud is inserted therethrough;
   d. building a support sub-assembly by mating the stud to the support;
   e. building a deck sub-assembly by inserting the rod through two or more of the plurality of slats;

f. inserting the flange into at least one of the plurality of slats and mating the rod end with the distal end of the flange;
g. rotating the flange with the rod mated therewith within the deck sub-assembly to position the external aperture of the flange for access through the retainer hole;
h. inserting the stud of the support sub-assembly through the proximal end of the flange into the longitudinal channel, so that the notch of the stud aligns with the external aperture of the flange; and
i. fastening the support sub-assembly and deck sub-assembly to one another by inserting a retainer 80 through the retainer hole of the slat and through the external aperture in the flange to contact the notch of the stud, thereby retaining the stud within the flange and drawing the support sub-assembly toward the deck sub-assembly.

The method further including: providing a plurality of spacers 70; and, in (e), positioning one of the plurality of spacers between each slat of the deck sub-assembly and inserting the rod therethrough.

The method further including: providing a driver 90; in (c)(ii), the flange having a flange head 49 configured to mate with the driver; and, in (g), mating the driver with the flange head and rotating the flange with the rod mated therewith with the driver.

The embodiments of the fastener system and methods of use described herein are exemplary and numerous modifications, combinations, variations, and rearrangements can be readily envisioned to achieve an equivalent result. Further, nothing in the above-provided discussions of the system and method should be construed as limiting the invention to a particular embodiment or combination of embodiments. The scope of the invention is defined by the appended claims.

I claim:
1. An article of slatted furniture comprising:
a deck sub-assembly including:
  a plurality of slats, each having a through hole, one slat of the plurality of slats having a retainer hole oriented substantially orthogonally to the through hole;
  a rod having a rod end, the rod inserted through the through holes oft wo or more of the plurality of slats along a longitudinal axis; and
  a tubular element having an external aperture opening to a transverse channel oriented substantially orthogonally to the longitudinal axis, the external aperture positioned for access through the retainer hole;
a support;
a stud extending from the support, the stud extending into the through hole of the one slat and coupled to the rod along the longitudinal axis, the stud having a notch positioned to align with the retainer hole in the one slat to provide external access to the stud though the retainer hole; and
a retainer inserted through the retainer hole and the external aperture, and engaged with the notch in the stud.

2. The slatted furniture of claim 1, wherein the rod is configured to be freely rotatable within the through hole of each of the connected plurality of slats.

3. The slatted furniture of claim 1, wherein the notch is circumscribed around the stud.

4. The slatted furniture of claim 1, wherein the notch has sides which taper inwardly from a sidewall of the stud to a floor of the notch.

\* \* \* \* \*